United States Patent [19]

Nardi

[11] 4,369,384

[45] Jan. 18, 1983

[54] ALTERNATOR FOR A MARINE ENGINE

[75] Inventor: Givoanni Nardi, Pisa, Italy

[73] Assignee: Whitehead Motofides S.p.A., Leghorn, Italy

[21] Appl. No.: 335,555

[22] Filed: Dec. 29, 1981

Related U.S. Application Data

[63] Continuation of Ser. No. 50,508, Jun. 20, 1979, abandoned.

[30] Foreign Application Priority Data

Jul. 5, 1978 [IT] Italy .............................. 53479/78[U]

[51] Int. Cl.³ .......................................... H02K 15/00
[52] U.S. Cl. ...................................... 310/42; 310/89; 310/268
[58] Field of Search ............. 310/70, 70 A, 153, 75 R, 310/89, 268, 156, 168, 68 R, 42, 74

[56] References Cited

U.S. PATENT DOCUMENTS

| | | | |
|---|---|---|---|
| 2,603,202 | 7/1952 | Kiekhaefer | 310/89 X |
| 3,150,278 | 9/1964 | Clark | 310/89 |
| 3,525,005 | 8/1970 | Beyers | 310/268 X |
| 3,824,419 | 7/1974 | Skizypezyk | 310/89 |
| 4,007,387 | 2/1977 | Rustecki | 310/42 |
| 4,076,989 | 2/1978 | Watson | 310/89 |
| 4,337,406 | 6/1982 | Binder | 310/89 X |

Primary Examiner—Donovan F. Duggan
Attorney, Agent, or Firm—Merriam, Marshall & Bicknell

[57] ABSTRACT

An alternator for internal combustion engines is described. Said alternator comprises a rotor (14, 15) rotated by the engine, and a fixed stator (16, 17) which faces the rotor and from which an alternating electrical voltage is taken. The main feature of this alternator is that in the air gap between the rotor and stator, the lines of flux of the magnetic field are substantially parallel to the axis of rotation of the rotor.

4 Claims, 3 Drawing Figures

ALTERNATOR FOR A MARINE ENGINE

This is a continuation of application Ser. No. 50,508, filed June 20, 1979, now abandoned.

BACKGROUND OF THE INVENTION

This invention relates to an alternator for internal combustion engines, in particular for outboard marine engines, and of the type comprising a rotor rotated by the engine, and a fixed stator, which faces the rotor and from which an alternating electrical voltage is taken.

In the various known embodiments, the rotor, which creates the magnetic field, is generally disposed such that the lines of flux in the air gap between the rotor and stator are substantially perpendicular to the axis of rotation of the rotor. However, such an arrangement of the rotor gives rise to substantial centrifugal stresses, and sometimes leads to constructional difficulties, especially where fitting to engines which are already constructed and therefore have their component members already prearranged.

SUMMARY OF THE INVENTION

The object of the present invention is to provide an alternator for internal combustion engines, in particular for marine engines, which does not comprise the aforesaid drawbacks, i.e. which does not give rise to additional stresses in the rotating members, nor gives rise to constructional or installation difficulties, and which is also particularly suitable for fitting to already constructed engines, for example as an accessory.

The invention provides an alternator for internal combustion engines, comprising a rotor rotated by said engine, and a fixed stator which faces the rotor and from which an alternating electrical voltage is taken, wherein in the air gap between the rotor and stator, the lines of flux of the magnetic field are substantially parallel to the axis of rotation of the rotor.

BRIEF DESCRIPTION OF THE DRAWINGS

The present invention will be more apparent from the description of one embodiment given hereinafter by way of non-limiting example with reference to the accompanying drawings in which.

DETAILED DESCRIPTION OF THE INVENTION

Figure 1:
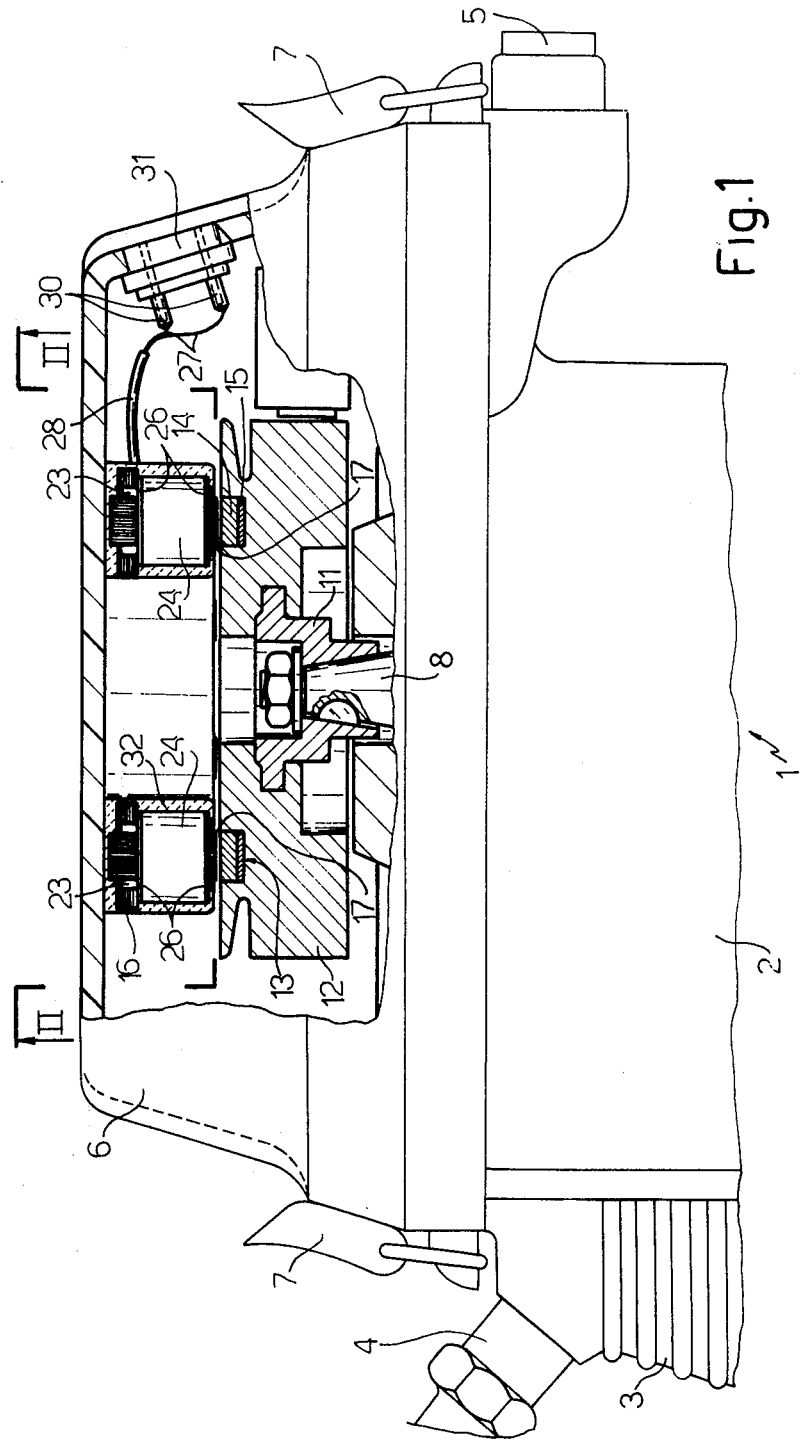
FIG. 1 is a partly sectional side view of an outboard engine to which the alternator of the present invention is fitted.

With reference to FIG. 1, the alternator of the present invention is shown fitted to an outboard engine of known type, indicated overall by the reference numeral 1, of which the upper part is illustrated, showing an engine casing 2, a cylinder head 3, part of a sparking plug 4 and an extinguishing pushbutton 5. A cover 6 can be hooked on to the top of the engine by two hooks 7. The cone frustum end 8 of the drive shaft passes through the engine casing 2 and into the cover 6, and is fixed in known manner to a steel part 11 connected to a substantially cylindrical flywheel 12 of known type, advantageously of mazak, and comprising in its upper side region a groove in which a pull-starting cord is wound.

The upper face of the flywheel 12 is provided with an annular cavity 13, in which the rotor of the alternator according to the present invention is housed. This rotor is constituted by an annular plate 14 of permanent magnetic material, for example plastoferrite, disposed coaxially with the axis of rotation of the flywheel 12, and contained in a plane perpendicular to this axis, and disposed substantially in line with the upper surface of the flywheel 12. A relatively small thickness annular plate 15 of ferromagnetic material, advantageously soft iron, is disposed below said annular plate 14 in the cavity 13.

Figure 2:
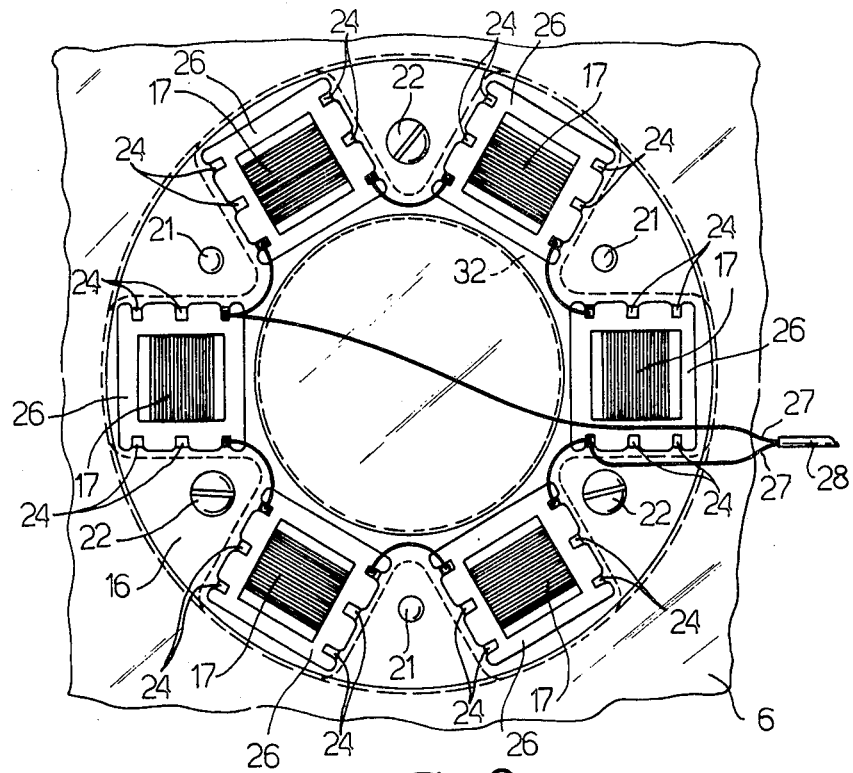
FIG. 2 is a section on the line II—II through the alternator of FIG. 1.
Figure 3:
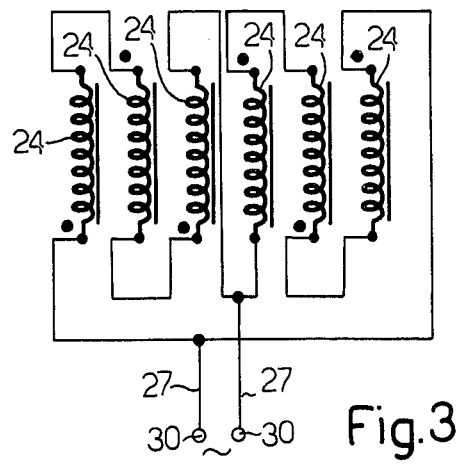
FIG. 3 shows the basic electrical circuit diagram of the alternator of the present invention.

The rotor contained in the annular cavity 13 is faced by the stator, which is fixed to the cover 6 and is shown in FIG. 2. The stator comprises a ferromagnetic core constituted by an annular base part 16 disposed coaxially to the axis of rotation of the flywheel 12, and contained in a plane perpendicular to this axis, and comprising a plurality of columns 17 (six in the example shown) which are disposed parallel to the axis of rotation of the flywheel 12 along the annular rim defined by said annular part 16. The columns 17 are fixed at one end to the annular part 16, and their other end faces the annular plate 14 at a short distance therefrom, to define a small air gap. Both the annular part 16 and columns 17 are constructed from a plurality of similar elements formed into a pack. The annular base part 16 is conveniently constructed by superposing ten single identical elements comprising three bores disposed at 120° apart, in which three rivets 21 are placed to lock the single elements into a pack and thus form the annular part 16 overall, and they also comprise a further three bores disposed at 120° apart through which three screws 22 pass for fixing the annular part 16 and consequently the stator to the inner surface of the cover 6. The annular part 16 also comprises six through apertures which house the six columns 17. Each column 17 is formed from a plurality of single elements (for example twenty-four) fitted together into a pack by means of a rivet 23 fixed towards the end housed in the aperture in the annular port 16. For this purpose, this aperture has a profile such that it can also house the rivet 23. Around each column 17 there is provided a relative winding 24 constituted by a plurality of turns wound on a spool with a central cavity into which the column 17 is inserted, and an upper and lower base wall 26. The ends of the various windings 24 are connected together in accordance with the electrical circuit diagram shown in FIG. 3, in which two groups, each consisting of three series-connected windings 24, are connected in parallel. The ends of these two groups are connected to two terminals 30 of a socket 31 fixed to the cover 6, by means of two wires 27 inside a single sheath 28.

The described alternator of the present invention is assembled as follows.

The annular cavity 13 is first formed in the flywheel 12, and the annular plate 14 and annular plate 15 are then fixed in this cavity by three screws 120° apart. The three permanent magnetic poles, of alternately opposite signs, are then formed in the annular plate 14 by a suitable apparatus constituted advantageously by columns disposed so that they face the annular plate 14, and in which the magnetic fields of alternately opposite sign are created. In this manner, six magnetic poles (the same number as the columns 17) are formed in the annular plate 14, these being spaced equidistantly apart and of alternately opposite signs, their lines of flux being parallel to the axis of rotation of the flywheel 12. Between two consecutive magnetic poles (of opposite sign) there is a neutral zone, in three of which are disposed the screws for fixing the plates 14 and 15 to the flywheel 12. The stator is constructed by fixing together the pack for the annular base part 16 using the three rivets 21, then fixing together the pack for the six columns 17 using the rivets 23, then inserting the six columns 17 into the corresponding apertures in the annular base part 16, and then fixing the columns 17 to the part 16 by squeezing the upper projecting part of said columns 17 along two lateral grooves already formed in the elements making up the pack for the columns 17, then fixing each winding 24 on to its column 17 by inserting the columns 17 into the central cavity in the spool and bending the two side elements of the columns 17 on to the lower base wall 26 of the spool so as to fix it in position, then making the electrical connection between the terminals of the various windings 24 in accordance with the arrangement of FIG. 3, and then impregnating the six windings 24 on the columns 17 with insulating material 32, advantageously epoxy resin. The stator constructed in this manner can then be fixed into the cover 6 by three screws 22, and the wires 27 can then be connected to the terminal 30. The cover 6 can then be fixed to the motor casing 2 by the hooks 7 such that the stator faces the rotor coaxially and at a short distance therefrom, as shown in FIG. 1.

The operation of the described alternator according to the present invention is as follows. The cone frustum end 8 of the drive shaft rotates the flywheel 12 and consequently the annular plate 14 comprising the plurality of magnetic poles, which cause a variation in the flux linkage with the windings 24 of the stator, and an alternating induced electromotive force is therefore produced in these windings and is available at the socket 31. The value of this voltage and its frequency depend on the constructional characteristics of the alternator. The voltage can advantageously be 12 Volts and the frequency 50 Hz. The flux lines of the magnetic field created by the magnetic poles of the annular plate 14 pass through the air gap between the rotor and stator in a direction substantially parallel to the axis of rotation of the flywheel 12, then pass through the relative facing column 17, traverse the annular base part 16, then pass back through an adjacent column 17, again traverse the air gap and a pole of opposite sign in the annular plate 14, and then return to the previous pole through the annular plate 15.

With the described alternator of the present invention, there is consequently the advantage that because of the arrangement of the rotor such that lines of flux from the relative magnetic poles pass through the air gap in a direction parallel to the axis of rotation of the rotor, said rotor can be conveniently housed in the flywheel in a plane perpendicular to the axis of rotation of the flywheel, and is therefore involved in no centrifugal stress due to additional elements. The arrangement of the stator above the upper surface of the flywheel facilitates installation of the facing stator, which is easily fitted in the case of outboard engines, and in no way prevents removal of the cover, so that it is always possible to pull-start the engine by winding the cord around the groove in the flywheel 12. This arrangement of the stator and rotor also enables the alternator to be easily added as an accessory to already constructed engines.

Finally, it is apparent that modifications can be made to the alternator of the present invention which do not leave the scope of the inventive idea. Accessory elements can also be added, such as a rectifier block and/or voltage regulator for the alternating voltage produced by the alternator. The rectifier block can for example be contained inside the cover 6 and connected between the wires 27 and terminals 30.

What we claim is:

1. In an outboard marine engine having an engine casing and a rotatably driven flywheel extending beyond one end of the engine casing and including an annular groove adapted to receive a cord for pull-starting the engine, the improvement of an alternator/cover assembly for said outboard marine engine, said improvement comprising:

a cover for said outboard marine engine adapted to enclose said flywheel at said engine casing end, including snap disengagement means for removably disengaging said cover from said engine casing;

an alternator driven by said engine, including a rotor embedded in an annular seat provided in the upper surface of said flywheel in a plane perpendicular to the axis of rotation of said flywheel, and a fixed stator adapted to oppositely face the upper surface of said flywheel so that in the air gap between the stator and rotor the lines of flux of the magnetic field are substantially parallel to the axis of rotation of the rotor; and means rigidly mounting said stator to the interior of said cover to fix the relative positions of said rotor and stator during operation of said engine and to enable said stator to be removable from said marine engine simultaneously with operation of said snap disengagement means and ensuing removal of said cover from said engine to permit ready access to said flywheel and said flywheel annular groove.

2. An alternator as claimed in claim 1, wherein said snap disengagement means comprises at least two hooks.

3. An alternator as claimed in claim 1, in which said stator comprises a core of ferromagnetic material comprising a plurality of vertical columns of substantial material comprising a plurality of vertical columns of substantial height which are constructed with a plurality of elements fixed together into a pack and which are disposed parallel to the axis of rotation of said rotor and at one end face said rotor, while at their other end are connected to an annular part coaxial to the axis of rotation of said rotor and contained in a plane perpendicular to said axis, wherein said columns are disposed in apertures in said annular part, and including means for maintaining said columns in position by squeezing the end region of said columns.

4. An alternator as claimed in claim 3, wherein windings from which an alternating electric voltage is taken are disposed around said columns, said windings and said columns being impregnated with insulating material.

* * * * *